US009240991B2

(12) United States Patent
Zlatarev

(10) Patent No.: US 9,240,991 B2
(45) Date of Patent: Jan. 19, 2016

(54) ANTI-PHISHING SYSTEM FOR CROSS-DOMAIN WEB BROWSER SINGLE SIGN-ON

(71) Applicant: Stephan Zlatarev, Sofia (BG)

(72) Inventor: Stephan Zlatarev, Sofia (BG)

(73) Assignee: SAP SE, Walldorf (DE)

( * ) Notice: Subject to any disclaimer, the term of this patent is extended or adjusted under 35 U.S.C. 154(b) by 96 days.

(21) Appl. No.: 13/713,397

(22) Filed: Dec. 13, 2012

(65) Prior Publication Data

US 2014/0173711 A1     Jun. 19, 2014

(51) Int. Cl.
*G06F 7/04*     (2006.01)
*H04L 29/06*     (2006.01)

(52) U.S. Cl.
CPC .................................. *H04L 63/0815* (2013.01)

(58) Field of Classification Search
CPC ............................. H04L 12/2461; H04L 63/10
USPC ....................................................... 726/26–30
See application file for complete search history.

(56) References Cited

U.S. PATENT DOCUMENTS

| | | | | |
|---|---|---|---|---|
| 6,717,589 B1* | 4/2004 | Grillo | .................... | G06F 9/4446 715/711 |
| 7,240,006 B1* | 7/2007 | Brocious | ........... | G06F 17/30896 704/270 |
| 7,861,077 B1* | 12/2010 | Gallagher, III | ......... | G06F 21/33 713/155 |
| 2004/0230647 A1* | 11/2004 | Rawat | ............... | G06F 17/30899 709/203 |
| 2005/0048458 A1* | 3/2005 | Collins | .................... | G09B 7/02 434/323 |
| 2006/0041759 A1* | 2/2006 | Kaliski, Jr. | ............... | G06F 21/31 713/184 |
| 2006/0282678 A1* | 12/2006 | Ali | .......................... | G06F 21/34 713/185 |
| 2008/0201332 A1* | 8/2008 | Souders | ............ | G06F 17/30867 |
| 2012/0144311 A1* | 6/2012 | Yeh | ........................ | G06Q 10/10 715/744 |
| 2013/0041899 A1* | 2/2013 | Simske | ............. | G06F 17/30893 707/736 |

OTHER PUBLICATIONS

Kim et al., "Improving Cross-domain Authentication overWireless Local Area Networks," Security and Privacy for Emerging Areas in Communications Networks, 2005. SecureComm 2005. First International Conference on Year: 2005 pp. 127-138.*
Phiri et al., "Fusion of Multi-Modal Credentials for Authentication in Digital Identity Management Systems," Wireless Broadband and Ultra Wideband Communications, 2007. AusWireless 2007. The 2nd International Conference on Year: 2007, pp. 20-20.*

* cited by examiner

*Primary Examiner* — Roderick Tolentino
(74) *Attorney, Agent, or Firm* — Schwegman Lundberg & Woessner, P.A.

(57) ABSTRACT

A system and method for cross-domain web browser single sign-on is described. A client accesses a workflow view from a service provider. An identity provider of the service provider generates an authentication process view. The authentication process view has the workflow view provided by the service provider and a logon form view provided by the identity provider.

19 Claims, 8 Drawing Sheets

ANTI-PHISHING SYSTEM FOR CROSS-DOMAIN WEB BROWSER SINGLE SIGN-ON

FIELD

The present disclosure relates generally to authentication processes, and in a specific example embodiment, to an anti-phishing system for cross-domain web browser single sign-on.

BACKGROUND

Several standards, such as SAML (http://saml.xml.org/) and OpenID (http://openid.net/), provide means for web sites to delegate authentication of their users to external authentication authorities. As part of the authentication process, the protocol flow requires the user to interact both with the system of the requested service and with the authenticating authority system where the two systems belong to different security domains. There are challenges to balance the interaction with the two systems. On the one hand, authentication must be performed in a secure manner, which requires that the integrity and origin of any data transmitted between the two systems should be able to be verified and that the identity of the authenticating authority system should be able to be verified by the user so that the user can have confidence in presenting their credentials. On the other hand, the user experience of the workflow with the requested service should present a smooth integration of the authentication flow, which may include related self-services such as self-registration and password recovery, into the workflow of the service. For example, the inability of the authentication process to convey the context of the different services together with their various concepts of user experience may turn potential users away from these services.

BRIEF DESCRIPTION OF DRAWINGS

The appended drawings merely illustrate example embodiments of the present invention and cannot be considered as limiting its scope.

FIG. 1 is a block diagram illustrating an example embodiment of a cross-domain single sign-on.

FIG. 2 is a block diagram illustrating another example embodiment of a cross-domain single sign-on.

FIG. 4 is a flowchart of a method, in accordance with an example embodiment, for generating an authentication process view for a cross-domain single sign-on.

FIG. 5 is a flowchart of a method, in accordance with an example embodiment, for validation logon credentials from an authentication process view for a cross-domain single sign-on.

FIG. 6 is a flowchart of a method, in accordance with another example embodiment, for generating an authentication process view for a cross-domain single sign-on.

FIG. 7 is a flowchart of a method, in accordance with another example embodiment, for generating an authentication process view for a cross-domain single sign-on.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments. It will be evident, however, to those skilled in the art that embodiments of the inventive subject matter may be practiced without these specific details. In general, well-known instruction instances, protocols, structures, and techniques have not been shown in detail.

Examples of a system and method for an anti-phishing system for cross-domain web browser single sign-on are described. Single sign-on (SSO) is a property of access control of multiple related, but independent software systems. With this property, a user logs in once and gains access to all systems without being prompted to log in again at each of them. However, the potential for phishing (impersonation of a legitimate website) increases with the use of cross-domain single sign-on because the user may think they are providing credentials to a legitimate web site. The present disclosure provides a system for combination of control of the service over the user experience and the control of the user over their credentials. The advantage of this system is that it provides a sufficient level of control over user experience while maintaining strong visibility and control of the user over their credentials. This allows the system to effectively combat phishing attacks.

In one example embodiment, a client may access a workflow view from a service provider. The workflow view may include, for example, a workflow process for accessing secure data or services provided by the service provider. For instance, a customer at a client may attempt to access a sales workflow process to manage an inventory or sales. In other words, the workflow process may be a business workflow, an Information Technology (IT) workflow, or any other type workflow process of services provided by the service provider. An identity provider corresponding to the service provider generates an authentication process view for the client. The authentication process view includes the workflow view provided by the service provider and a logon form view provided by the identity provider.

Figure 1:
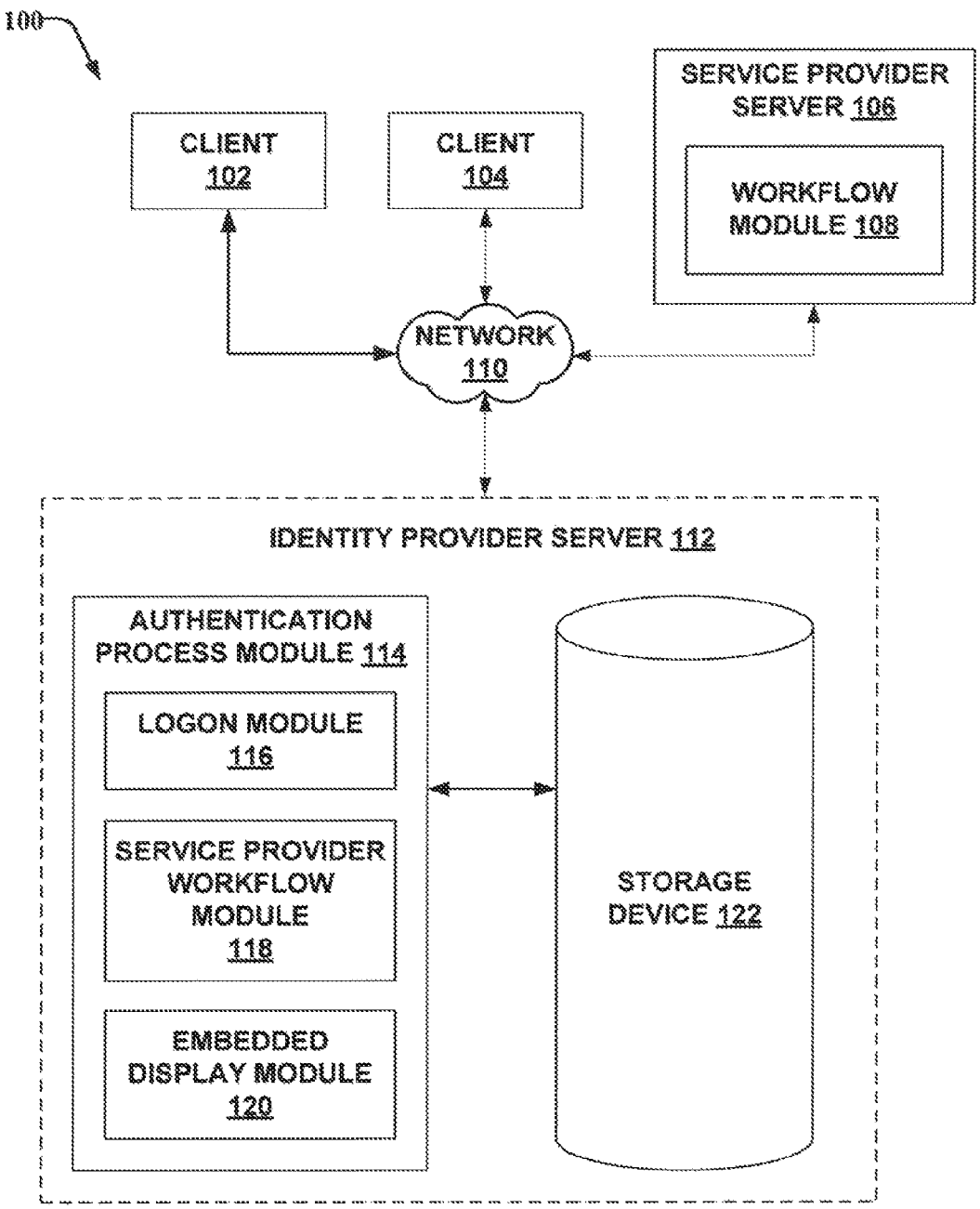

With reference to FIG. 1, a system 100 in which example embodiments may be practiced is shown. The system 100) comprises clients 102 and 104, a service provider server 106, and an identity provider server 112. Clients 102 and 104 may include a web browser application (not shown) used to access a service provided by the service provider server 106. Clients 102 and 104 are communicatively coupled to the service provider server 106 and the identity provider server 112 via a computer network 110. The computer network 110 may include, for example, one or more of a wired or wireless network, a local area network (LAN), or a wide area network (WAN). While the example embodiment of FIG. 1 shows an authentication process module 114 and a workflow module 108 in one corresponding server system each (e.g., service provider server 106 and identity provider server 112), alternative embodiments may contemplate the various components of the authentication process module 114 and a workflow module 108 being embodied within several systems (e.g., cloud computing system, server farm system).

In one embodiment, the service provider server 106 includes a workflow module 108. The workflow module 108 receives requests from clients 102 and 104 to connect and access services or applications provided by the service provider server 106. As previously described, the workflow module 108 generates a workflow view as part of a workflow process to access secure data or services provided by the service provider server 106. The workflow module 108 may, for example, generate an initial web page or a welcome web page for clients 102 and 104 to properly identify and/or describe the services that clients 102 and 104 are seeking to access. As part of the workflow view, the workflow module 108 may ask users from clients 102 and 104 to authenticate themselves prior to accessing the service provided by the services provider server 106. In one embodiment, the workflow module 108 may redirect clients 102 and 104 to an authenticating service such as the identity provider server 112 or use a cross-domain single sign-on scheme.

In one embodiment, the identity provider server 112 includes an authentication process module 114 and a storage device 122. The authentication process module 114 includes a logon module 116, a service provider workflow module 118, and an embedded display module 120. The authentication process module 114 may be configured to access the workflow view from the workflow module 108 of the service provider server 106 and generate an authentication process view for clients 102 and 104. The authentication process may include, for example, the workflow view provided by the workflow module 108 and a logon form view provided by the logon module 116.

The service provider workflow module 118 may receive a web browser communication request from clients 102 and 104 to access the workflow view of the service provider server 106 at the identity provider server 112. The service provider workflow module 118 may also receive the workflow view requested by clients 102 and 104 from the service provider server 106.

The logon module 116 of the authentication process module 114 may receive logon credentials in the logon form view from clients 102 and 104 at the identity provider server 112. The logon module 116 may also perform a validation of the logon credentials provided by clients 102 and 104 at the identity provider server 112 and provide a confirmation of the validation of the logon credentials to the service provider server 106, and redirect clients 102 and 104 to the service provider server 106.

The embedded display module 120 may provide a URL address identifying the identity provider server 112 to be displayed in an address field of the web browser application in clients 102 and 104. The embedded display module 120 may also generate the authentication process view in the web browser application of clients 102 and 104.

The storage device 122 may store logon credentials corresponding to clients 102 and 104. For example, the logon credentials may include usernames and passwords or other types of authenticating schemes (e.g., encryption keys, certificates, and so forth). The entries provided by clients 102 and 104 may compared against the logon credentials stored in the storage device 122 to validate authenticating clients 102 and 104.

As such, the service provider workflow module 118 provides increased visibility and control over credentials for the user so that the user can identify the system to which the user presents their credentials and the channel's transport security.

In other conventional schemes, the relying service uses an embedded view as part of the Web site of the service where the user is asked to enter their credentials (e.g. user name and password) to present them to the authenticating authority. This allows full control of the service over the look and feel of the screens, and therefore over the user experience during the authentication process. However, it may reduce the visibility and control of the user on how their credentials are being handled.

Another technique relies on a similar embedded view is rendered by the authenticated authority itself (e.g., service provider server 106). This allows less control of the service over the look and feel because the context of the service is still provided by the embedding view and the look and feel can be possibly customized by the authenticating authority for this service. The visibility and control of the user is still low as the Web browsers (or other user agents) show the identity of the top (embedding) view and not of any embedded elements (such as HTML elements). Both techniques make it easier for a phishing attack where a malicious server pretends to use the same authenticating authority and asks the victim user to present them with their credentials.

Yet another technique involves the service redirecting the web browser of the user to the system of the authenticating authority for the authentication process, expecting that it will redirect the web browser back to the service once the process is complete. This allows even less control of the service over the user experience because the context of the workflow is kept only with the allowed customization of the authenticating authority system for this service. The visibility and control over credentials for the user are, however, strongly increased as the user can identify the system it presents their credentials to and the channel's transport security.

Figure 2:
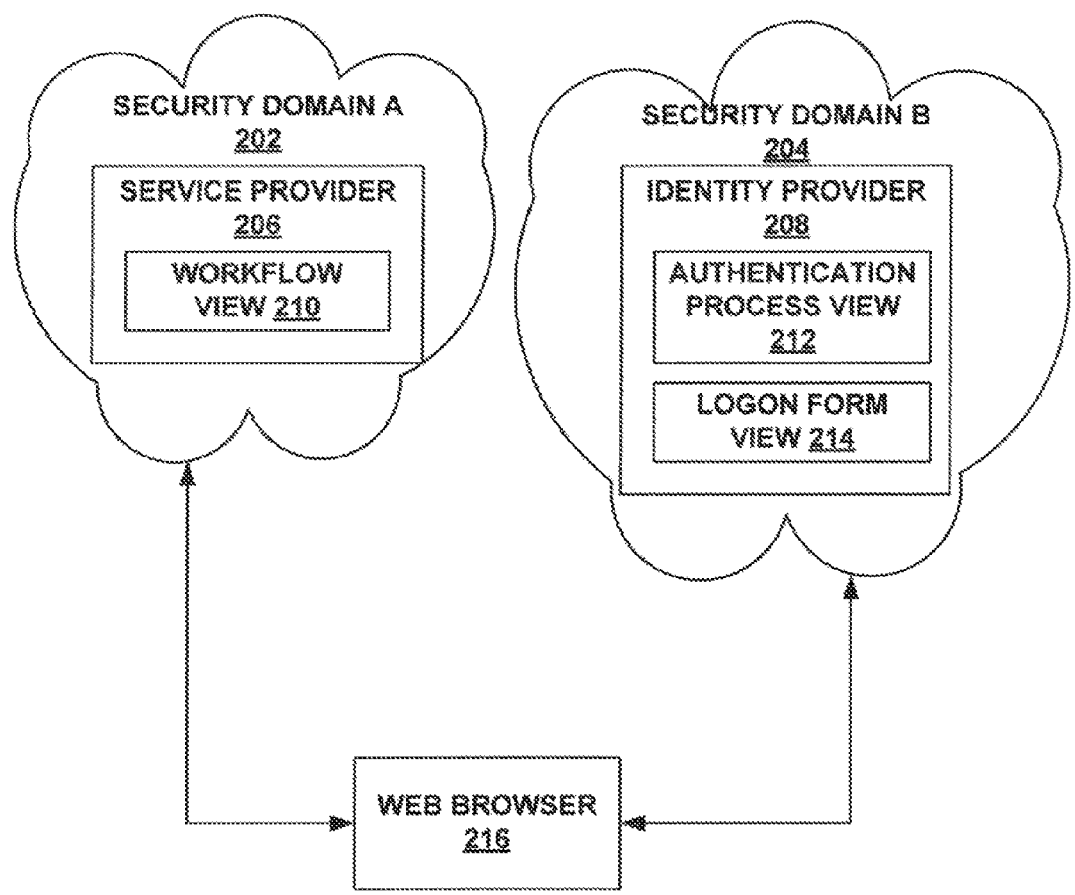

FIG. 2 is a block diagram illustrating another example embodiment of a cross-domain single sign-on. A web browser 216 seeks to access service from security domain A 202 provided by a service provider 206. In particular, the service provider 206 generates a workflow view 210 in response to a communication request from the web browser 216. The service provider 206 may request that the user at web browser 216 to authenticate themself with an identity provider 208 at security domain B 204. The identity provider 208 may generate an authentication process view 212 that embeds a logon form view 214.

Figure 3:
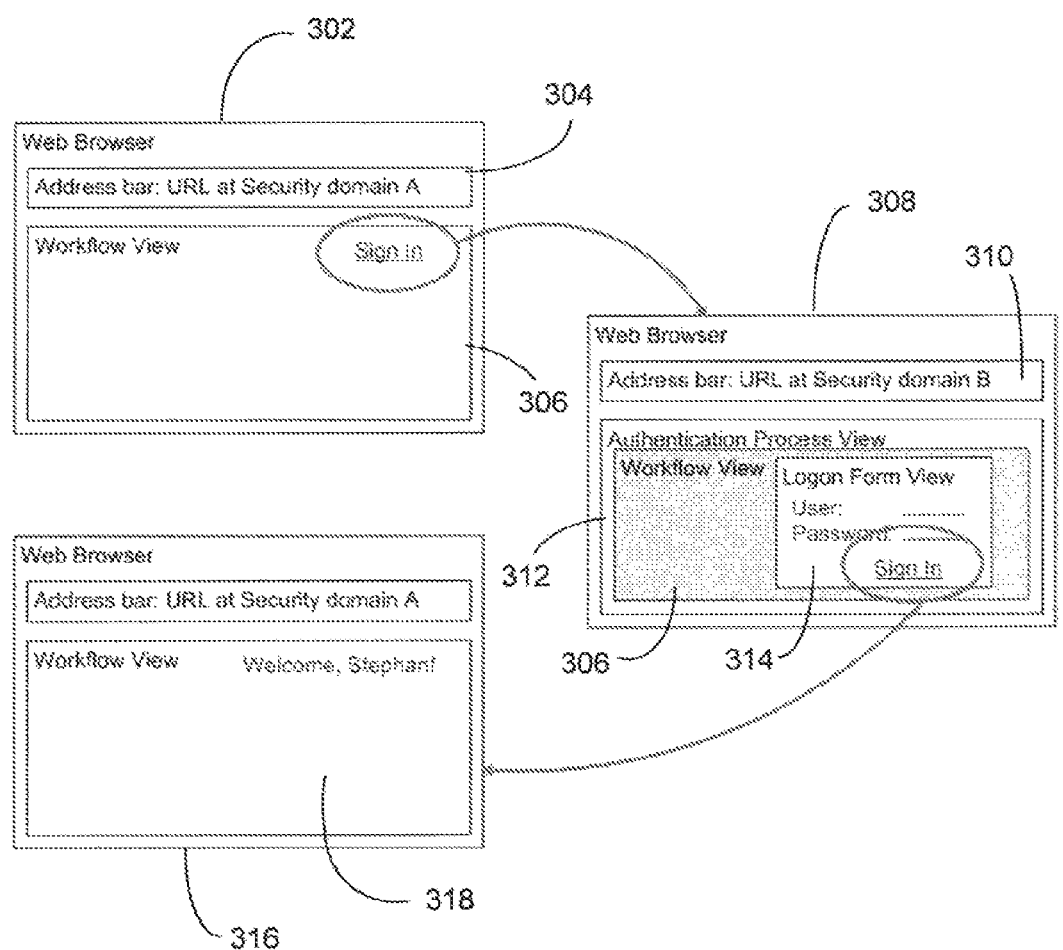
FIG. 3 is a diagram illustrating an example embodiment of an authentication process using the cross-domain single sign-on system of FIG. 2.

FIG. 3 is a diagram illustrating an example embodiment of an authentication process using the cross-domain single sign-on system of FIG. 2. In particular, FIG. 3 provides examples of web browser views of a client seeking to access services from a service provider 206 corresponding to the cross-domain single sign-on system of FIG. 2.

The web browser 302 illustrates a client accessing the service provider 206 at the security domain A 202. For example, the address bar 304 of the web browser 302 displays the URL address of the service provider 206 at the security domain A 202. The web browser 302 also displays a workflow view 306. When a user signs in on the workflow view 306, the web browser 302 is a redirected to the identity provider 208 at the security domain B 204.

FIG. 3 illustrates the web browser 308 at the security domain B 204. For example, the address bar 310 of the web browser 308 displays the URL address of the identity provider 208 at the security domain B 204. The web browser 308 also displays an authentication process view 312 including the workflow view 306 and a logon form view 314 embedded in the workflow view 306. The authentication process view 312 combines sufficient control of the service over the context of the workflow during the authentication process with strong control of the user over their credentials by having the authenticating authority use screens or windows with embedded views during the authentication process and related self-services, such as self-registration and password recovery.

The top window (e.g., authentication process view 312) of the authentication process is served by the authenticating authority system (e.g., identity provider 208) so that the web browser 308 identifies the system of origin as the authenticating authority itself. The top window (e.g., workflow view 306) embeds a view served by the requested service for the workflow context. The top view embeds another view (e.g., logon form view 314) served by the authenticating authority for the authentication screens. In one embodiment, the authentication screens may be presented as modal windows by having the second view shown over the first view, where the first view is possibly dimmed and is prevented from handling user input.

In another embodiment, the switch between the screens may be served by the relying service and the authenticating authority can be optimized for best user experience by use of optimized embedded views and/or by use of animated elements to hide redirection and loading times.

After the user signs in by providing credentials such as a username and password, the authenticating authority system redirects the web browser 308 back to the relying service with a response carrying the result so that the service can continue the workflow. The web browser 316 illustrates a workflow view 318 where the user has been authenticated.

As such, the present disclosure provides a combination of control of the service over the user experience and the control of the user over their credentials. One advantage of this system is that it provides a sufficient level of control over user experience while maintaining strong visibility and control of the user over their credentials. This allows the system to effectively combat cross-domain phishing attacks.

Figure 4:
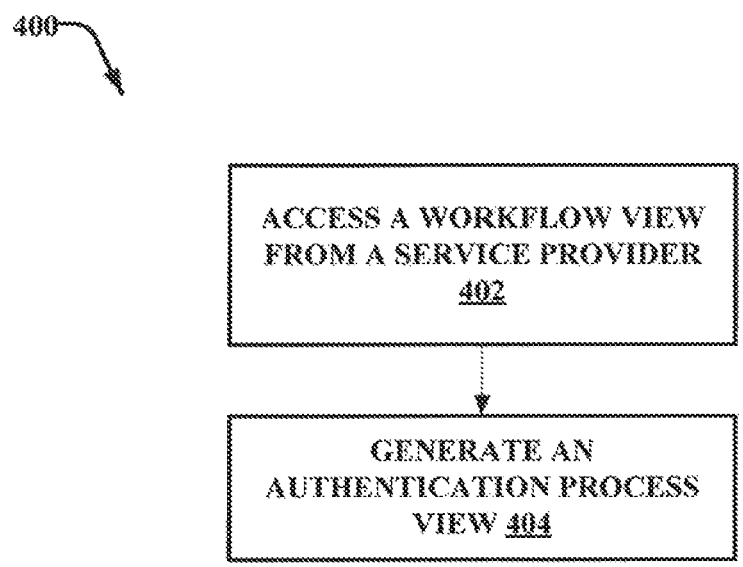

FIG. 4 is a flowchart of a method 400, in accordance with an example embodiment, for generating an authentication process view 312 for a cross-domain single sign-on. At operation 402, a workflow view 306 from a service provider 206 is accessed or retrieved from an identity provider 208. For example, the identity provider 208 may receive a portion or a copy of the workflow view 306 from the service provider 206 when a client is redirected to the identity provider 208 to be authenticated. In one embodiment, the identity provider 208 learns from the URL link of the web browser 308 of the client that the client has been redirected from the service provider 206 to the identity provider 208. The identity provider 208 may retrieve the workflow view 306 corresponding to URL Link of the web browser 308 of the client from the service provider 206. In another embodiment, the service provider 206 may send the workflow view 306 to the identity provider 208 upon redirecting the client to the identity provider 208. In yet another embodiment, the identity provider 208 may have a pre-configured address of the workflow of the service provider 206.

At operation 404, the identity provider 208 associated with the service provider 206 generates an authentication process view 312 that includes the workflow view 306 provided by the service provider 206 and a logon form view 314 provided by the identity provider 208. In one embodiment, the authentication process view 312 may be generated by the embedded display module 120 of the identity provider server 112 of FIG. 1.

Figure 5:
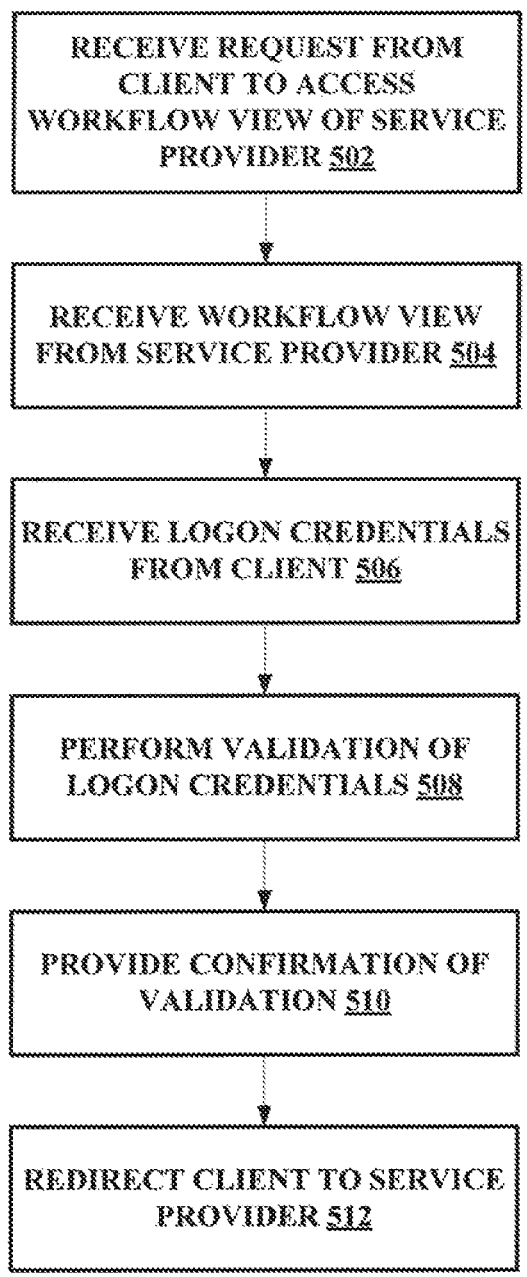

FIG. 5 is a flowchart of a method 500, in accordance with an example embodiment, for validating logon credentials from an authentication process view 312 for a cross-domain single sign-on. At operation 502, the identity provider 208 receives a web browser communication request from a client to access the workflow view 306 of the service provider 206. For example, the identity provider 208 receives a communication request from the client that identifies that the client has been redirected from a service provider 206 associated with the identity provider 208 to the identity provider 208.

At operation 504, the identity provider 208 receives or retrieves the workflow view 306 requested by the client from the service provider 206. In another embodiment, the identity provider 208 may retrieve the workflow view from the storage device 122 instead of from the service provider 206.

At operation 506, the identity provider 208 receives logon credentials (e.g., username and password) in the logon form view 314 from the client.

At operation 508, the identity provider 208 performs a validation of the logon credentials from the client by comparing the entries from the client with the stored logon credentials corresponding to the client or user at the identity provider 208.

At operation 510, the identity provider 208 provides a confirmation of the validation of the logon credentials to the service provider 206 and redirects the client to the service provider 206 at operation 512. In one embodiment, the identity provider 208 redirects the client back to the service provider 206 regardless of whether the entries from the client are valid. In other words, if the login from the client was not successful, a corresponding message, such as a "try again" message, may be displayed on the web browser 316 of the client when the client is redirected back to the service provider 206. Similarly, if the logon from the client was successful, a corresponding message, such as a welcome message, may be displayed on the browser of the client when the client is redirected back to the service provider 206.

Figure 6:
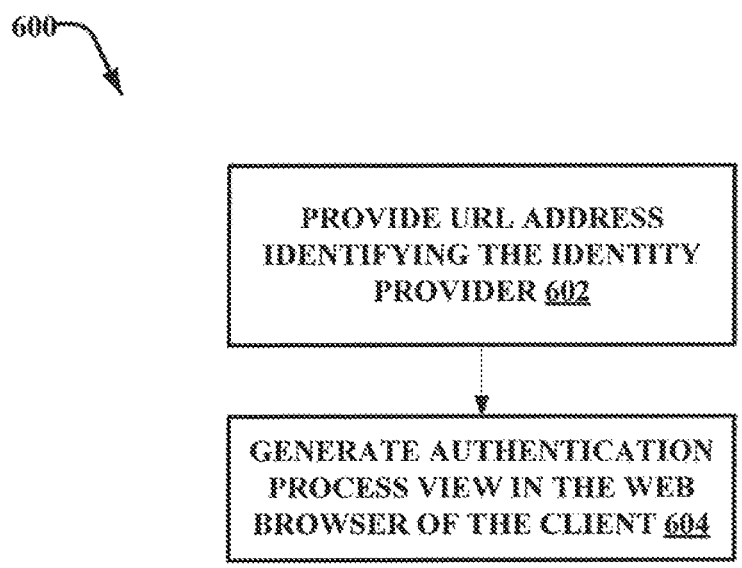

FIG. 6 is a flowchart of a method 600, in accordance with another example embodiment, for generating an authentication process view 312 for a cross-domain single sign-on. At operation 602, the web browser 308 of the client identifies and confirms the identity provider 208 by displaying the URL address of the identity provider 208 in the address bar of the web browser 308. In other words, the user of the web browser 308 of the client can be assured that he or she is accessing the correct security domain. For example, after the web browser 308 follows a redirect from the service provider 206, the web browser 308 displays the redirected URL address in the address bar of the web browser 308.

At operation 604, the identity provider 208 generates an authentication process view 312 in the web browser 308 of the client. In one embodiment, the workflow view 306 is embedded in the authentication process view 312 in the web browser 308 of the client and the logon form view 314 is embedded in the workflow view 306. FIG. 3 illustrates an example of the authentication process view 312.

Figure 7:
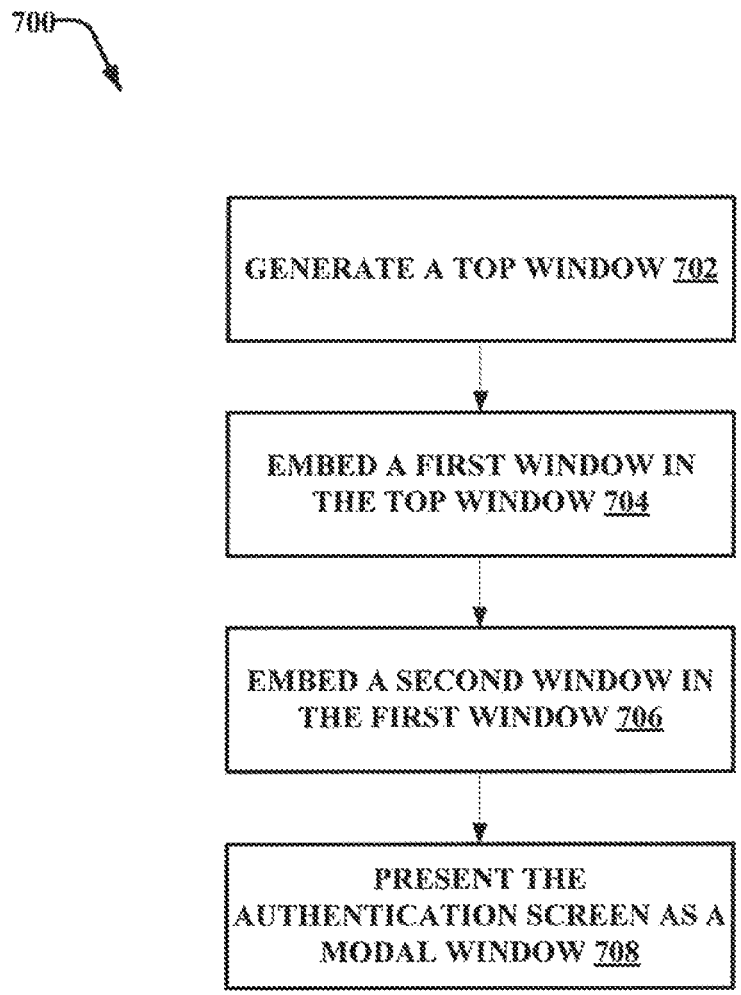

FIG. 7 is a flowchart of a method 700, in accordance with another example embodiment, for generating an authentication process view 312 for a cross-domain single sign-on. At operation 702, a top window comprising the authentication process view 312 is generated for the web browser 308 of the client.

At operation 704, a first window is embedded in the top window. For example, the first window may be served by a requested service of the service provider 206 for the workflow view 306. In one embodiment, the embedded display module 120 of the authentication process module 114 of FIG. 1 may be used to implement operation 704.

At operation 706, a second window is embedded in the first window. For example, the second window may be served by an authenticating authority of the identity provider 208 for an authentication screen. In one embodiment, the embedded display module 120 of the authentication process module 114 of FIG. 1 may be used to implement operation 706.

At operation 708, the authentication screen may be presented as a modal window by having the second window shown over the first window, where the first window is dimmed and is prevented from handling user input. In one embodiment, the embedded display module 120 of the authentication process module 114 of FIG. 1 may be used to implement operation 708.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Figure 8:
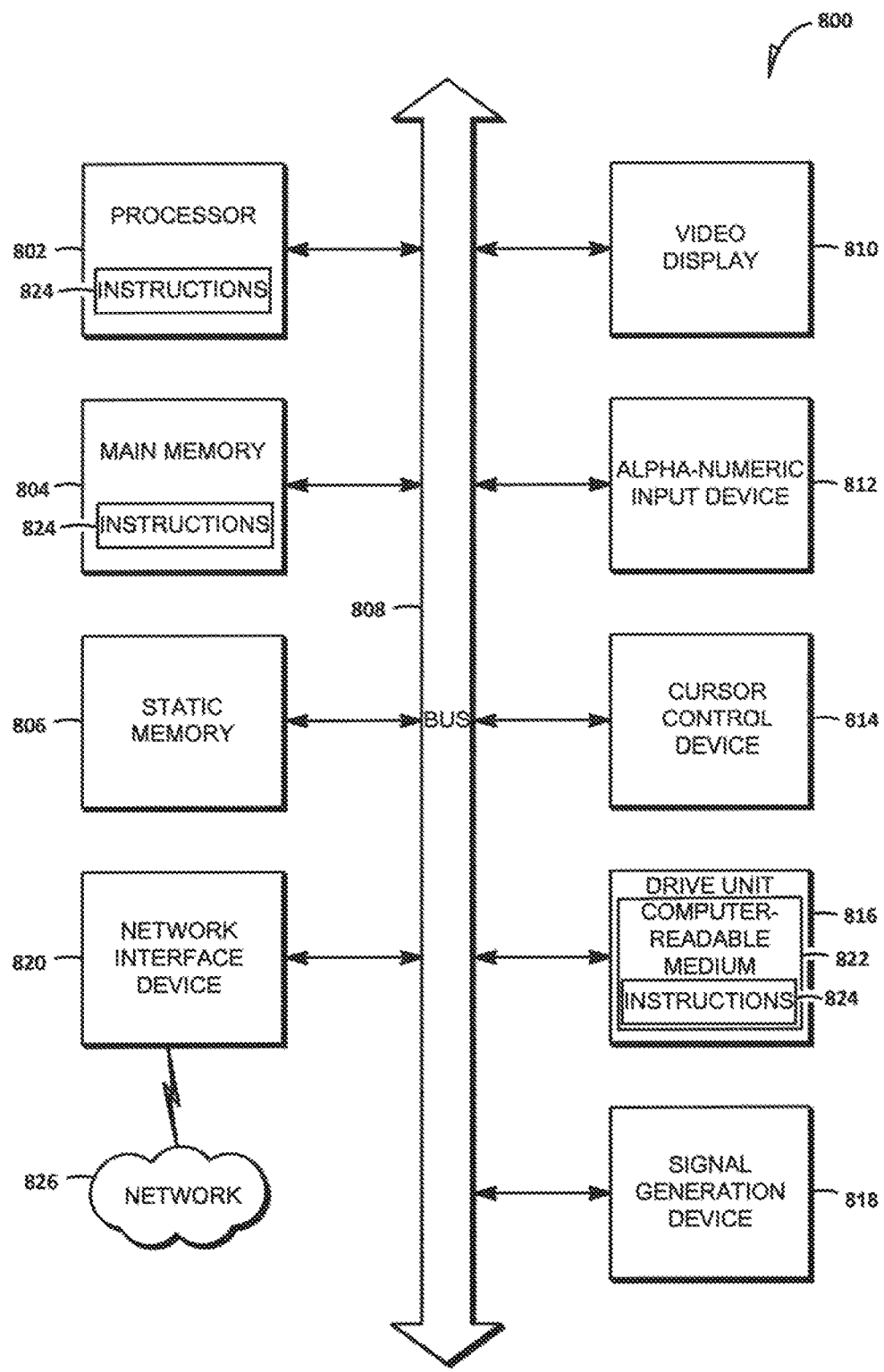
FIG. 8 is a block diagram of a machine in an example form of a computing system within which a set of instructions for causing the machine to perform any one or more of the methodologies discussed herein may be executed.

With reference to FIG. 8, an example embodiment extends to a machine in the example form of a computer system 800 within which instructions 824 for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, a server, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 may include a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). In example embodiments, the computer system 800 also includes one or more of an alpha-numeric input device 812 (e.g., a keyboard), a user interface (UI) navigation device or cursor control device 814 (e.g., a mouse), a disk drive unit 816, a signal generation device 818 (e.g., a speaker), and a network interface device 820.

The disk drive unit 816 includes a computer-readable storage medium 822 on which is stored one or more sets of instructions 824 and data structures (e.g., software instructions) embodying or used by any one or more of the methodologies or functions described herein. The instructions 824 may also reside, completely or at least partially, within the main memory 804 or within the processor 802 during execution thereof by the computer system 800, the main memory 804 and the processor 802 also constituting machine-readable media.

While the computer-readable storage medium 822 is shown in an exemplary embodiment to be a single medium, the term "computer-readable storage medium" may include a single storage medium or multiple media (e.g., a centralized or distributed database, or associated caches and servers) that store the one or more instructions 824. The term "computer-readable storage medium" shall also be taken to include any tangible medium that is capable of storing, encoding, or carrying instructions for execution by the machine and that causes the machine to perform any one or more of the methodologies of embodiments of the present description, or that is capable of storing, encoding, or carrying data structures used by or associated with such instructions. The term "computer-readable storage medium" shall accordingly be taken to include, but not be limited to, solid-state memories, optical and magnetic media, and non-transitory machine-readable storage media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 824 may further be transmitted or received over a communications network 826 using a transmission medium via the network interface device 820 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

It should be noted that various modifications and changes may be made to these example embodiments without departing from the broader spirit and scope of the present disclosure.

As used herein, the term "or" may be construed in either an inclusive or exclusive sense. Additionally, although various example embodiments discussed focus on a specific network-based environment, the embodiments are given merely for clarity in disclosure. Thus, any type of electronic system, including various system architectures, may employ various embodiments of the search system described herein and is considered as being within a scope of example embodiments.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of the example embodiments as represented by the appended claims. The specification and drawings are, accordingly, to be regarded in an illustrative rather than a restrictive sense.

What is claimed is:

1. A computer-implemented method comprising:
    receiving, at an identity provider server, an authentication request, the authentication request responsive to a client device requesting access to at least one service of a service provider server, the service provider server being in a first security domain and the identity provider server being in a second security domain;
    retrieving, at the identity provider server and from the service provider server, a copy of a workflow view presented to the client device by the service provider server, the workflow view presented in a web browser of the client device and identifying the first security domain in the web browser; and
    generating an authentication process view at the identity provider server, the authentication process view comprising the copy of the workflow view that was previously presented in the web browser of the client device and a logon form view embedded in the copy of the workflow view, the authentication process view being provided by the identity provider server to the web browser of the client device and identifying the second security domain as a trusted identity provider in the web browser by displaying a Uniform Resource Locator (URL) address of the identity provider in an address bar of the web browser;
    authenticating, at the identity provider server, the client device based on logon credentials received via the logon form view; and
    redirecting the web browser back to the service provider server and identifying the first security domain in the web browser instead of the trusted identity provider by displaying the URL address of the service provider in the address bar of the web browser.

2. The computer-implemented method of claim 1, further comprising:
    providing a confirmation of the authentication of the logon credentials to the service provider server.

3. The computer-implemented method of claim 1, further comprising:
    embedding the workflow view in the authentication process view in the web browser of the client device.

4. The computer-implemented method of claim 1, further comprising:
    generating a top window comprising the authentication process view in the web browser;
    embedding a first window in the top window, the first window served by a requested service of the service provider server for the workflow view; and
    embedding a second window in the first window, the second window served by an authenticating authority of the identity provider server.

5. The computer-implemented method of claim 4, further comprising:
    presenting the authentication process view as a modal window by having the second window shown over the first window, where the first window is dimmed and is prevented from handling user input.

6. The computer-implemented method of claim 1, further comprising:
    after authenticating the client device, providing the service provider server with a response carrying an authentication result so that the service provider server can continue a workflow corresponding to the workflow view.

7. The computer-implemented method of claim 1 wherein retrieving the copy of the workflow view includes utilizing a pre-configured address of the workflow view of the service provider.

8. The computer-implemented method of claim 1 wherein retrieving the copy of the workflow view includes retrieving the workflow view corresponding to a Uniform Resource Locator (URL) Link of the web browser of the client from the service provider.

9. An authentication system comprising:
    an identity provider server comprising a processor and memory, the memory storing a service provider workflow module and an authentication process module to be executed by the processor; and
    a network communication interface to communicate with a client device and a service provider server, the identity provider server configured to receive an authentication request, the authentication request responsive to the client device requesting access to at least one service of the service provider server, the service provider server being in a first security domain and the identity provider server being in a second security domain, the service provider workflow module configured to retrieve a copy of a workflow view presented to the client device by the service provider server, the workflow view presented in a web browser of the client device and identifying the first security domain in the web browser, and the authentication process module configured to:
generate an authentication process view, the authentication process view comprising the copy workflow view that was previously presented in the web browser of the client device and a logon form view embedded in the copy of the workflow view, the authentication process view being provided by the identity provider server to the web browser of the client device and identifying the second security domain as a trusted identity provider in the web browser by displaying a Uniform Resource Locator (URL) address of the identity provider in an address bar of the web browser; and authenticate the client device based on logon credentials received via the logon form view, and redirect the web browser back to the service provider server and identify the first security domain in the web browser instead of the trusted identity provider by displaying the URL address of the service provider in the address bar of the web browser.

10. The system of claim 9, the authentication process module further configured to:
provide a confirmation of the authentication of the logon credentials to the service provider server.

11. The system of claim 9, the memory further storing an embedded display module to be executed by the processor, wherein the embedded display module is configured to embed the workflow view in the authentication process view in the web browser of the client device.

12. The system of claim 9, the memory further storing an embedded display module to be executed by the processor, wherein the embedded display module is configured to generate a top window comprising the authentication process view in the web browser, to embed a first window in the top window, the first window served by a requested service of the service provider for the workflow view, to embed a second window in the first window, the second window served by an authenticating authority server of the identity provider server.

13. The system of claim 12, wherein the embedded display module is configured to present the authentication process view as a modal window by having the second window shown over the first window, where the first window is dimmed and is prevented from handling user input.

14. The system of claim 9, wherein after authenticating the client device, the web browser of the client device is redirected back to the service provider server with a response carrying an authentication result so that the service provider can continue a workflow corresponding to the workflow view.

15. The system of claim 9, further comprising a storage device for storing reference logon credentials corresponding to the client device.

16. A non-transitory machine-readable storage medium storing instructions which, when executed by at least one processor, performs operations comprising:
receiving, at an identity provider server, an authentication request, the authentication request responsive to a client device requesting access to at least one service of a service provider server, the service provider server being in a first security domain and the identity provider server being in a second security domain;
retrieving, at the identity provider server and from the service provider server, a copy of a workflow view presented to the client device by the service provider server, the workflow view presented in a web browser of the client device and identifying the first security domain in the web browser; and
generating an authentication process view at the identity provider server, the authentication process view comprising the copy of the workflow view that was previously presented in the web browser of the client device and a logon form view embedded in the copy of the workflow view, the authentication process view being provided by the identity provider server to the web browser of the client device and identifying the second security domain as a trusted identity provider in the web browser by displaying a Uniform Resource Locator (URL) address of the identity provider in an address bar of the web browser;
authenticating, at the identity provider server, the client device based on logon credentials received via the logon form view; and
redirecting the web browser back to the service provider server and identifying the first security domain in the web browser instead of the trusted identity provider by displaying the URL address of the service provider in the address bar of the web browser.

17. The non-transitory machine-readable storage medium of claim 16, further comprising:
providing a confirmation of the authentication of the logon credentials to the service provider server.

18. The non-transitory machine-readable storage medium of claim 16, further comprising:
embedding the workflow view in the authentication process view in the web browser of the client device.

19. The non-transitory machine-readable storage medium of claim 16, further comprising:
generating a top window comprising the authentication process view in the web browser;
embedding a first window in the top window, the first window served by a requested service of the service provider server for the workflow view; and
embedding a second window in the first window, the second window served by an authenticating authority of the identity provider server.

* * * * *